April 7, 1970 R. G. WRENCH ET AL 3,505,617

RIPPLE REDUCTION IN A HALF-LATTICE CRYSTAL FILTER
USING THREE PARALLELED CRYSTALS RESONANT AT
LOWER, CENTER AND UPPER EDGE OF PASS-BAND
Filed Feb. 12, 1968

INVENTORS
RICHARD G. WRENCH
RICHARD H. TUZNIK
BY
ATTORNEYS

United States Patent Office 3,505,617

Patented Apr. 7, 1970

3,505,617

RIPPLE REDUCTION IN A HALF-LATTICE CRYSTAL FILTER USING THREE PARALLELED CRYSTALS RESONANT AT LOWER, CENTER AND UPPER EDGE OF PASS-BAND

Richard G. Wrench, Auburn, Wash., and Richard H. Tuznik, Erie, Pa., assignors, by mesne assignments, to the United States of America as represented by the Secretary of the Navy Filed Feb. 12, 1968, Ser. No. 704,744
Int. Cl. H03h *9/00*
U.S. Cl. 333—72 1 Claim

ABSTRACT OF THE DISCLOSURE

In filters, a half-lattice section with three crystals are paralleled and are resonant, respectively, to $f_0$, $$f_0+\frac{\Delta f}{2}, \text{ and } f_0-\frac{\Delta f}{2}$$

The passband is broadened and squared, and ripple is minimized.

BACKGROUND

In the classic lattice filter section, impedance $Z_a$ and $Z_b$ are connected in series with and in shunt across the circuits through the filter and may have two, three or more poles and zeros in the passband. The impedances $Z_a$ and $Z_b$ customarily comprise resonant and anti-resonant circuits. More recently the Z's have been replaced by piezoelectric crystal elements, and in the interest of economy, the full lattice design is simplified by the so-called half-lattice design. Here, the reactances of one LC resonator is doubled and the reactances of the second LC resonator is halved, whereupon two arms of the full lattice may be omitted.

Unfortunately, the impedance of the filter thus constituted in the passband is not smooth but permits as much as three db ripple variation in the output.

The object of this invention is to provide an improved half-lattice filter with minimum ripple in the passband of the filter.

SUMMARY

The object of this invention is attained by connecting three piezoelectric elements, A, B, and C in parallel and to one input terminal. The other terminals of crystal elements A and B are connected to one end of an anti-resonant circuit and the other terminal of crystal element C is connected to the other end of the anti-resonant circuit. The electrical center of the anti-resonant circuit is grounded and the output terminals are connected to the upper end of the anti-resonant circuit.

Other objects and features of this invention will become apparent to those skilled in the art by referring to the preferred embodiment described in the following specification and shown in the accompanying drawing in which.

Figure 1:
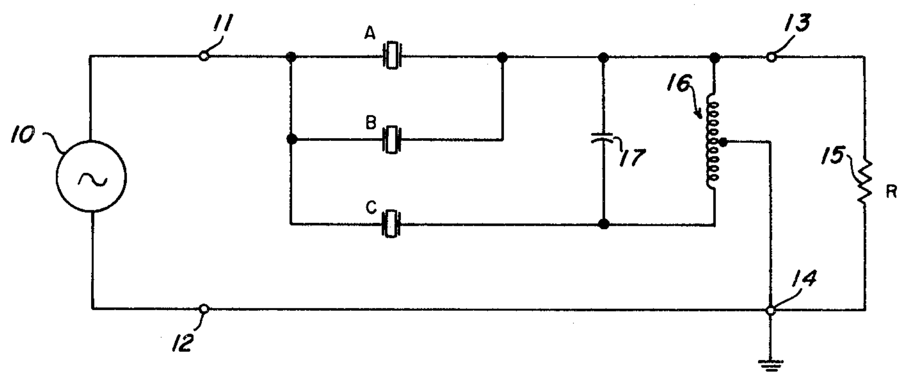
FIG. 1 is a schematic circuit diagram of the filter of this invention.

The four terminals of the filter of this invention are indicated in FIG. 1 at 11, 12, 13, and 14. The signal source will be assumed to be connected to the left hand terminals 11 and 12 and is indicated at 10. The signal source, may comprise a narrow or a broad band of frequencies. The load connected to the other terminals of the filter is shown at 15, is resistive, and is matched impedance-wise with the filter. For convenience terminals 12 and 14 will be referred to as a reference ground.

The inductive reactance 16 is connected at one end to the output terminal 13. Capacitive reactance 17 is connected across the winding and is of such a value as to cause the tank circuit to resonate in the passband. The electrical center of the resonant circuit is grounded, preferably by a mid tap or center tap to the winding 16. Inductances L on either side of the tap are approximately equal. Alternatively, capacitance 17 could comprise two series condensers with the common terminal grounded.

According to an important characteristic of this invention three piezoelectric crystal elements, A, B, and C are employed. Crystals A and B are connected in parallel and between the input terminal 11 and output terminal 13 and hence to the upper end of anti-resonant circuit 16–17, while the third crystal C is connected between terminal 11 and the opposite on lower end of the anti-resonant circuit 16–17. The next important feature of this invention the crystal C is resonant to the center frequency $f_0$ of the passband of the filter while crystals A and B are, respectively, resonant to frequencies $$f_0+\frac{\Delta f}{2} \text{ and } f_0-\frac{\Delta f}{2}$$

where $\Delta f$ is the desired bandwidth of the filter.

Figure 2:
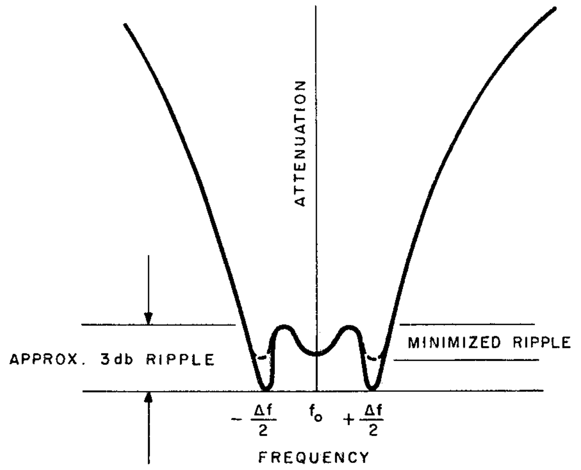
FIG. 2 is a diagram of the attenuation-frequency characteristic of the filter of FIG. 1.

The attenuation characteristic shown in solid line at FIG. 2 illustrates the distinct three pole passband attenuation of the conventional full lattice filter where two crystals resonant at the same frequency are connected in the filter. Such a ripple is substantial, and is found to approximate three db and to produce objectionable noise in the output of the filter. When, however, the two crystals A and B are, respectively, slightly above and below the resonant frequency $f_0$, the ripple is markedly reduced as shown by the dotted line in FIG. 2. That is, by slightly staggering the resonant frequencies of the three crystals, according to this invention, the passband portion of the attenuation curve is smoothed to minimize ripple. The squared sides of the curve are not deteriorated. The minimized ripple within the passband can possibly be attributed to the detuning and the slightly decreased Q of the filter circuits with the increase in apparent inherent resistance of the crystal elements.

The circuit parameter values depends upon the center frequency, bandwidth, and impedance level of the circuit. The resonant frequency of crystal C is the center frequency $f_0$ of the filter while the resonant frequency of crystals A and B are dispaced ½ the bandwidth from the center frequency. Typical values for $f_0$ are 450 kc. and of $\Delta f$ is 3 kc. The center-tapped winding is necessary to construct the hybrid half-lattice circuit, but the values of the winding design are not critical provided the winding is tuneable to the center freqency $f_0$. The transformer design may be of standard toroidal type, and the capacitance value is that required to tune the transformer. The attenuation versus frequency curve has a nominal 40 db to 3 db selectivity of 3.5 to 1.

What is claimed is:

1. A half-lattice four-terminal crystal filter for coupling a signal source to a load, said filter comprising:
three piezoelectric crystal elements A, B, and C,
a parallel resonant inductance-capacitance circuit connected at one end to one output terminal, the midpoint of said inductance being connected to the other output terminal,
crystal element C being connected between the other end of said resonant circuit and one terminal of said source, crystal elements A and B being connected in parallel between said one source terminal and said one output terminal, crystal element C being resonant to the center frequency, $f_0$, of the passband, $\Delta f$, of said filter and elements A and B resonant, respectively, to $$f_0+\frac{\Delta f}{2} \text{ and } f_0-\frac{\Delta f}{2}$$

References Cited

UNITED STATES PATENTS

| | | | |
|---|---|---|---|
| 2,097,458 | 11/1937 | Hansell | 333—72 |
| 2,266,658 | 12/1941 | Robinson | 333—72 |
| 2,959,752 | 11/1960 | Kosowsky | 333—72 |
| 2,990,525 | 6/1961 | Grant | 333—72 |
| 3,359,512 | 12/1967 | Malinowski et al. | 333—72 |
| 3,416,104 | 12/1968 | Argoudelis | 333—72 |

OTHER REFERENCES

Kosowsky, D. I.: "High Frequency Crystal Filter Design Techniques and Applications," Proc. I. R. E., February 1958, vol. 46, No. 2, pp. 419–429.

HERMAN KARL SAALBACH, Primary Examiner

W. H. PUNTER, Assistant Examiner